United States Patent [19]
Plummer

[11] 3,902,792
[45] Sept. 2, 1975

[54] LANDSCAPE LENS
[75] Inventor: William T. Plummer, Concord, Mass.
[73] Assignee: Polaroid Corporation, Cambridge, Mass.
[22] Filed: Jan. 2, 1974
[21] Appl. No.: 429,569

[52] U.S. Cl. .............. 350/189; 350/205; 350/206; 354/296
[51] Int. Cl. ..................... G02b 3/04; G02b 9/02
[58] Field of Search .......... 350/175, 189, 205, 206, 350/233; 354/296

[56] References Cited
UNITED STATES PATENTS

| | | | |
|---|---|---|---|
| 236,731 | 1/1881 | Sutler | 354/296 |
| 1,545,869 | 7/1925 | Weidert | 354/274 |
| 2,063,178 | 12/1936 | Merté | 350/175 R |
| 2,811,081 | 10/1957 | Praeger | 350/206 |

*Primary Examiner*—John K. Corbin
*Attorney, Agent, or Firm*—Frederick H. Brustman; John W. Ericson

[57] ABSTRACT

This invention is an improved landscape lens for a simple photographic camera. The improvement is achieved by placing a vignetting stop midway between the lens element and its regular aperture stop. It reduces the amount of blur otherwise found in the image at points removed from the center of the field. An aspheric refracting surface on the lens element further improves the image.

14 Claims, 6 Drawing Figures

PATENTED SEP 2 1975 3,902,792

LANDSCAPE LENS

BACKGROUND OF THE INVENTION

The present invention is an improvement for the optics of a plain photographic camera using a simple landscape lens.

A landscape lens consists of a simple positive meniscus lens element and an aperture stop. The arrangement is about 150 years old and it was originally used with photosensitive materials with such narrow spectral sensitivities in the blue region that satisfactory results were obtainable at large f/numbers without color corrections.

The aperture stop was used to minimize the coma aberration. It is well known that there is an optimum location for an aperture stop on the concave side of a meniscus lens element for the purpose of reducing coma. A useful correction for astigmatic field curvature can also be obtained by "bending" the lens element. Thus, its meniscus shape reduces another aberration.

Spherical aberration might be reduced slightly by the bending but only at the expense of astigmatic field curvature and since spherical aberration can be controlled by limiting the aperture stop, that was done. Thus, landscape lenses were classically limited to $f/11$ and usually smaller apertures. Also, they were limited to half field angles of 20° or less because of the degradation in image quality at greater field angles; see Jacobs, *Fundamentals of Optical Engineering*, McGraw-Hill, N.Y. (1943).

The landscape lens works adequately at small aperture ratios, e.g. $f/45$ to $f/22$. At larger aperture ratios, e.g. $f/8$ to $f/11$ the imagery toward the edge of the field is not as good as the center of the field due to inadequately controlled oblique light rays. The conventional way to correct the imagery toward the edge of the field is to use a small aperture or add additional lens elements. The former is photographically undesirable and the latter is economically undesirable.

Landscape lenses are simple and therefore inexpensive. Attempts to improve them for modern cameras and films have frequently been made. The present invention concerns improvements for a landscape lens, also.

The prior art includes references to structures which bear superficial relations to a part of the invention disclosed below.

U.S. Pat. No. 1,545,869 shows a camera with two diaphragms behind an achromatic doublet. One diaphragm is adjustable and is next to the doublet. The other diaphragm is fixed and rearward of the adjustable diaphragm. That patent attributes to the fixed diaphragm the function of cutting off noncorrected marginal rays in oblique pencils of light rays to prevent them from producing chromatic aberration. This makes no sense. Cutting off marginal light rays does not correct chromatic aberration. Moreover, the patent represents the lens to be achromatic and the stated function of the fixed diaphragm is purposeless.

A. E. Conrady in his book *Applied Optics and Optical Design* (Part II) Dover Publications, N.Y. (1960) shows an arrangement part of which has a superficial resemblance to the present invention described below. However, despite the superficial resemblance, its purpose is different. Conrady illustrates (FIG. 176) a triplet with a substantial barrel length which, because of its length, produces vignetting. He adds what he refers to as a reflection ring to make the total vignetting, due to the barrel and the reflection ring, symmetrical about the aperture stop location to the left of the triplet. The effect is to counterbalance an existing, but unfavorable, vignetting due to the long barrel of the triplet.

OBJECTS OF THE INVENTION

An object of the present invention is a photographic camera with a landscape lens useful at an aperture ratio of $f/9$ or faster.

Another object of the present invention is an improvement in the imagery across the field of a landscape lens.

Yet another object of the present invention is a landscape lens and camera with useful imagery to a half field angle of at least 26°.

These and other objects of the invention are achieved by fitting a photographic camera with an optical system consisting of: a meniscus lens element having an aspheric refracting surface; an aperture stop proximate the coma free position for the lens element; and a vignetting stop located approximately midway between the lens element and the aperture stop, with an opening somewhat larger than the opening of the aperture stop. The shutter can be immediately behind the aperture stop.

The meniscus shape of the lens element and the aspheric refracting surface serve primarily to reduce the astigmatic field curvature and spherical aberration in the real image produced by the lens. The preferred material for the lens element is polymethyl methacrylate. It is easily moldable and simplifies the manufacture of the lens element with an aspheric surface. Furthermore, the high Abbe dispersion number ($\nu = 58$) of polymethyl methacrylate minimizes the introduction of chromatic aberrations into the image formed by the lens element. The aperture stop located at the proper distance with respect to the lens substantially eliminates coma. With an $f/9$ aperture stop undesirable amounts of astigmatic field curvature remain in the image toward the edge of the field though none exists at the center of the field. The vignetting stop placed midway between the meniscus lens element and the aperture stop effectively reduce the effect of residual astigmatic field curvature toward the field edges without adversely affecting the image at the center of the field.

The interaction between the vignetting stop and the aperture stop for points toward the edge of the field effectively results in a smaller effective aperture for tangential light rays without substantially changing the effective aperture for sagittal light rays. The effective difference increases with field angle.

The result, in part, is to increase the effective depth of the tangential focus. Thus, overall photographic imagery is improved for landscape lenses according to the present invention at the expense of some relative light loss toward the edge of the field. However, this is more than compensated for by the fact that landscape lenses according to the present invention can readily utilize larger relative aperture stops than previously possible with simple landscape lenses. The amount of vignetting present with this invention need be no more than is common with conventional multielement photographic lenses.

DESCRIPTION OF THE DRAWINGS

For a fuller understanding of the nature and objects of the invention, reference should be had to the following detailed description taken in connection with the accompanying drawings wherein.

THE PREFERRED EMBODIMENT

Figure 1:
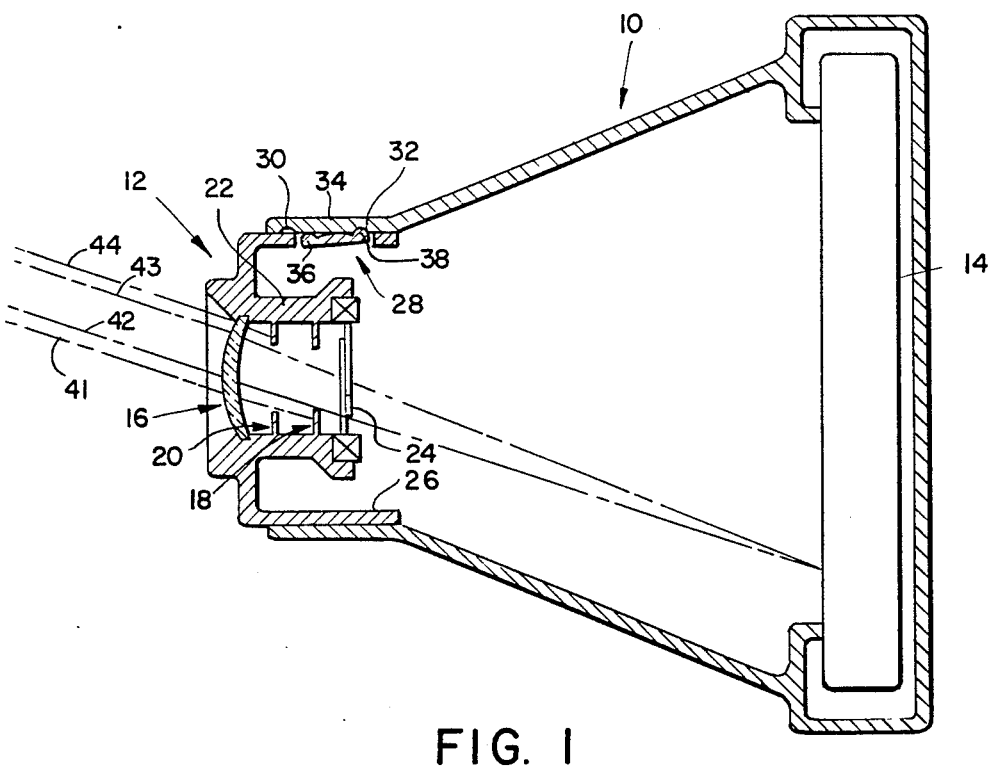
FIG. 1 illustrates a camera with an improved landscape lens according to the invention.

Reference should be had to FIG. 1. It shows a photographic camera 10 with an improved landscape lens optical system 12. The camera 10 also includes means (not shown) for inserting a film pack 14. The film pack 14 positions the photosensitive surface of a film unit in the film plane of the optical system 12.

The optical system 12 includes, an aspheric meniscus lens element 16, an aperture stop 18 proximate the coma free position of the lens element 16, and a vignetting stop 20 midway between the lens element 16 and the aperture stop 18. The present invention contemplates the possibility of reversing the aperture stop 18 and the vignetting stop 20, i.e. having the vignetting stop 20 proximate the coma free position and the aperture stop 18 midway between the lens element 16 and the vignetting stop 20. Interchanging the two stops 18 and 20 does not affect the substance of this disclosure.

The embodiment of the invention shown in FIG. 1 has the vignetting stop 20 and the aperture stop 18 formed as an integral part of a lens cell 22 that retains the lens element 16. The integral formation of the parts permits them to be made accurately but inexpensively by methods such as injection molding. The result is that the optical system 12 of this invention provides better optical images less expensively than by the usual method of adding extra lens elements to improve an optical system's imagery.

Behind the optical system 12 is a shutter 24. The shutter 24 may be operated in the usual manner; further elaboration on it is not necessary for an understanding of the present invention.

The optical system 12, like prior art landscape lenses, is a fixed focal length lens. It yields its best images for subjects a predetermined optimum distance in front of the camera 10. The optimum distance is a function of the lens element 16's focal length and its back focal distance to the film plane of the camera 10. Its images of subjects at different distances from the camera 10, though satisfactory, are less good in proportion to the difference with respect to the optimum distance.

To improve the optical system 12's imagery over the full range of possible subject distances the lens cell 22 is mounted in housing 26 which is axially movable between two positions. The two positions make available two different back focal distances for the optical system 12. The back focal distance is the distance from the rear surface of the lens element 16 to the film plane.

One back focal distance, the shorter one, is preselected to provide optimum imagery for subjects at distances of three meters and more from the camera 10. The other back focal distance is preselected to provide optimum imagery for subjects at distances of less than three meters from the camera 10.

Adjustment of the optical system 12 for one or the other of these distances is simplified by the use of a two position focusing system 28. The two position focusing system 28 comprises two cavities 30 and 32 formed in a sleeve 34 attached to the forward part of the camera 10's body. The housing is molded with two biased detents 36 and 38. Sliding the housing 26 rearward will allow the detent 38 to engage the cavity 32 establishing the shorter back focal distance for further subjects (illustrated). Sliding the housing 26 forward with sufficient force disengages the detent 38 and allows the detent 36 to engage the cavity 30 establishing the longer back focal distance for nearer subjects. The detents 36 and 38 can be molded as part of the housing 26. Those skilled in the art will appreciate that the housing 26 and the sleeve 34 can be provided with engaging screw threads instead of detents so a plurality of back focal distances can be obtained.

Figure 2:
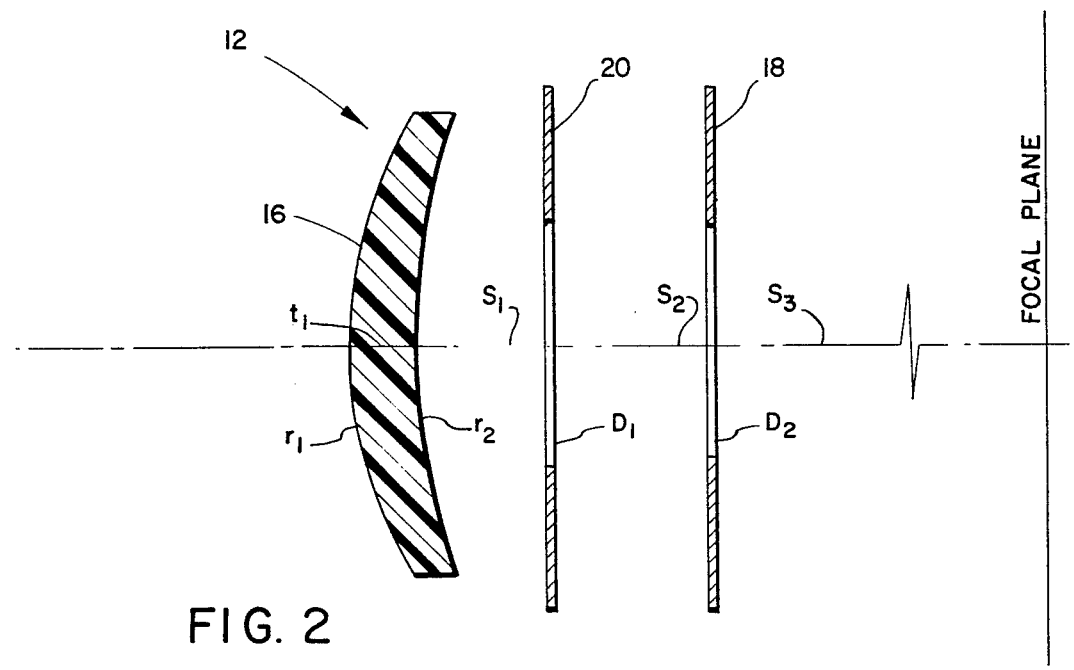
FIG. 2 illustrates in detail the lens element and its two stops.

Reference should be made to FIG. 2 with reference to the following discussion for a better understanding of the optical system 12. It shows only the optically important features of the optical system 12, i.e. the meniscus lens element 16, the vignetting stop 20 and the aperture stop 18. In this embodiment the meniscus lens element 16 is bent toward the focal plane and the two stops 18 and 20 are disposed on the concave side of the lens element 16, toward the focal plane.

Other embodiments can have the meniscus lens element 16 bent away from the focal plane. The two stops are still positioned on the concave side of the lens element 16, i.e. away from the focal plane.

The first refracting surface $r_1$ of lens element 16 is spherical and its second surface $r_2$ is aspherical. The predetermined aspherical shape of the surface provides more desirable corrections for spherical aberration that might otherwise be present in the image formed by the meniscus lens element 16. The concave surface $r_2$ is made as the aspheric one for ease of manufacturing the appropriate molds. Optically either surface could be the aspheric one.

The net bending of the meniscus lens element 16 is selected to reduce the astigmatic field curvature in the image formed at the focal plane. The thickness of lens element 16 is designated $t_1$ and it is chosen to enhance the imagery of the optical system 12. Its effect is secondary.

The aperture stop 18 having a diameter designated by $D_2$ is spaced apart from the vertex of surface $r_1$ by the sum of air spaces $s_1$ and $s_2$. This position is nominally that which provides the best correction for comatic aberration in the image.

The vignetting stop 20 is located midway between the meniscus lens element 16 and the aperture stop 18. Its separation from the vertex of surface $r_1$ is designated $s_1$ and its diameter is designated $D_1$. It is slightly larger than the aperture stop 18.

The location of the vignetting stop 20 is not critical. The midway location has the advantage of yielding a readily uniform decrease in illumination from the center of the image to the edge of the image (vignetting). A uniform decrease makes its effect on the exposure less noticeable to a person viewing a finished photograph.

The actual sizes of the aperture stop 18 and the vignetting stop 20 properly depend on the sizes of the air spaces $s_1$ and $s_2$. Minor changes are reasonable and those skilled in the lens design art recognize that such minor variations will be useful in obtaining the very best results when using the present invention in specific applications. This is also true with regard to the radii of surfaces $r_1$ and $r_2$ as well as the shape of the aspheric surface on surface $r_2$.

The following lens design formula is for an $f/9$ landscape lens of unit focal length, F, according to the invention, useful to a half field angle of 26°:

$n = 1.49$; $\nu = 58$; $r_1 = 0.184F$;
$r_2 = 0.278F$ at its vertex; $t_1 = 0.028F$; $s_1 = 0.056F$;
$s_2 = 0.068F$; $s_3 = 0.854$; $D_1 = 0.051F$;
$D_2 = 0.048F$.

The actual shape of aspheric surface $r_2$ is given by the equation $$Z = \frac{1}{2r_2}Y^2 + 29.083Y^4 - 44.969 \times 10^2 Y^6 + 38.08 \times 10^4 Y^8 - 10.991 \times 10^6 Y^{10}$$

where Z is the height of the surface $r_2$ from a reference plane and Y is the radial distance from the optic axis through the surface $r_2$.

The following formula is for a comparable landscape lens, but of the type known to the prior art. It is provided by comparison:

$n = 1.49$; $\nu = 58$; $r_1 = 0.206F$; $r_2 = 0.334F$; $t_1 = 0.028F$;
$s_1 + s_2 = 0.124F$; $s_3 = 0.853F$; $D_2 = 0.048F$

Both the foregoing formulas are in terms of unit focal length F and are for lenses to be molded from polymethyl methacrylate for ease of manufacture. Other transparent materials can be used instead with appropriate changes to the mathematical formulae.

Figure 3:
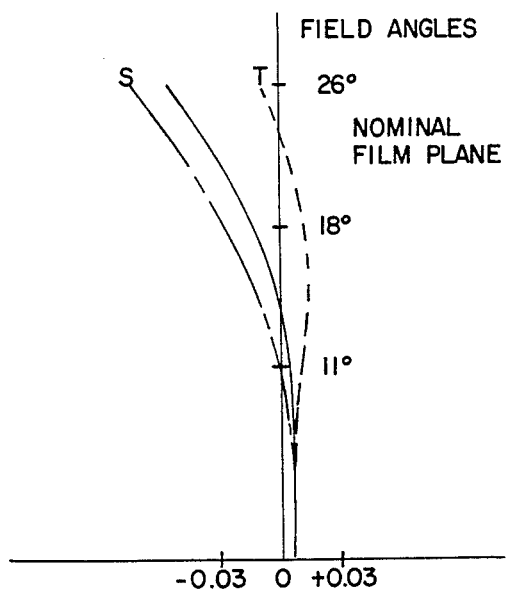
FIGS. 3 and 4 illustrate the shape of the astigmatic surfaces of certain optical arrangements.
Figure 5:
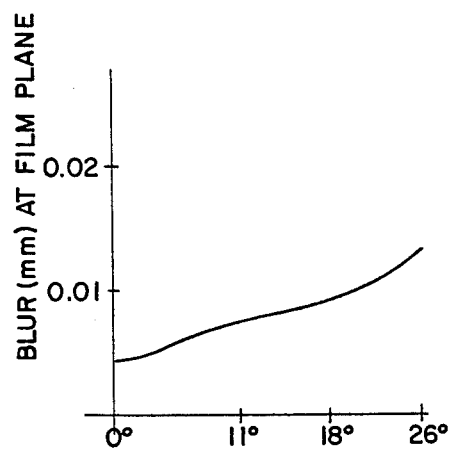
FIGS. 5 and 6 indicate the image quality provided by those arrangements at various distances from the center of the field.
Figure 4:
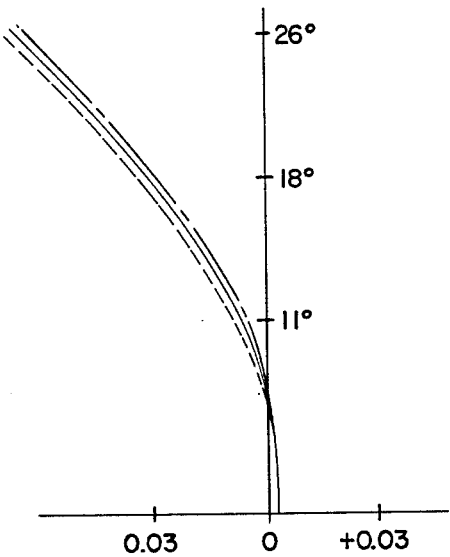
Figure 6:
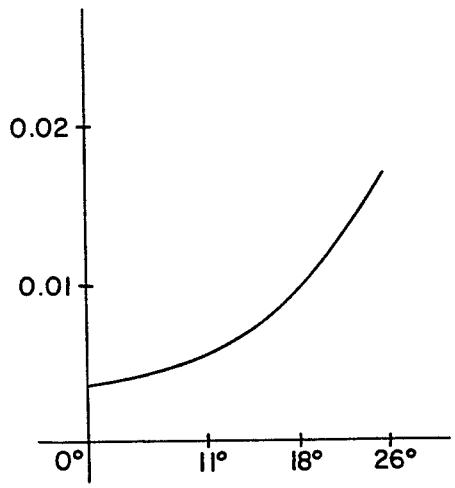

Reference should now be had to FIGS. 3–6. FIGS. 3 and 5 are calculated data for a 100mm focal length landscape lens according to the present invention (Formula I). FIG. 3 shows the axial displacement of the sagittal and tangential surfaces from the nominal film plane with respect to angular displacement from the axis. The solid line represents the locus of the circle of least confusion. FIG. 5 shows the image blur at the film plane as a function of angular displacement from the axis. The blur is represented by the root means square radius (in mm) for a calculated spot diagram of a theoretical point source. FIGS. 4 and 6 provide comparative information calculated for a conventional landscape lens (Formula II).

Comparison of FIGS. 3 and 4 makes it clear that a landscape lens according to this invention yields superior results. Its stigmatic surfaces are markedly less curved and its overall imagery is far superior at the larger field angles. This is an important advance as that part of the image lying between 11° and 26° represents the major part of the image's total area.

Reference to the information provided in FIGS. 5 and 6 emphasizes the comparison. They reveal that the blur for the improved landscape lens and the conventional one are comparable to about 11° field angle, but at greater angles the blur produced by the conventional landscape lens increases twice as fast as the blur in the image formed by a landscape lens with the vignetting stop added according to the invention. The blur is for the image formed at the nominal film plane.

An important advantage of the invention is that the improvement in imagery is gained inexpensively, merely by providing an additional stop between the meniscus lens element and the normal aperture stop.

A further advantage is that the side effect stemming from the vignetting stop is quite acceptable and indeed has an aesthetic advantage. The side effect is a comparative, but minor, decrease in relative $f$/number at intermediate field angles. In the conventional landscape lens the aperture stop provides an image of fairly uniform brightness to about 11°. Beyond 11° the image's brightness decreases approximately linearly and is about one $f$/stop less at the edge of the field.

The vignetting stop midway between the lens element and the aperture stop yields a uniform decrease of brightness toward the edge without any abrupt change to distract a person looking at a finished photograph. The dimension chosen for the diameter of vignetting stop in formula yields the same decrease in brightness at the edge of the field as the aperture stop alone. Its effect is at the intermediate points in the field. At extreme points in the field the lens element's rim again controls the vignetting.

The improvement might be explained as follows, paraxial light rays entering the camera "see" the opening through the vignetting stop 20 and the aperture stop 18 is circular. The effective $f$/number is determined by the aperture stop 18. However, pencils of light rays entering the optical system 12 obliquely do not see the opening through the vignetting stop 20 and the aperture 18 as circular, but see it instead as elliptical. The ellipticity increases with the obliqueness of the light ray pencils. That is, the minor axis of the effective opening decreases more rapidly with increasing obliqueness than the major axis.

This can be regarded in a sense, as selectively increasing the $f$/number and consequently the depth of focus for the tangential rays. The effect of the vignetting stop 20 and the aperture stop 18 on sagittal rays is less.

What takes place in the optical system 12 is depicted in FIG. 1 for an oblique pencil of light rays 41, 42, 43 and 44 lying in a tangential plane. The aperture stop 18 obstructs the light ray 41 but it passes rays 42 and 43. It would also pass ray 44 but for the vignetting stop 20. The light rays 41 and 44, farther from the center of a pencil, are harder to correct and therefore contribute more to the aberrations in an image formed by the lens 16 unless they are removed. The aperture stop 18 only does part of the job. It will be seen that it is the vignetting stop 20, midway between the meniscus lens element 16 and the aperture stop 18, that completes the task by obstructing the light ray 44. The vignetting stop 20 is not needed to affect axial pencils (not illustrated) and it clearly does not interfere with them.

Another result of the present invention should be mentioned as it bears on the usual pictures one obtains with a fixed focus or two zone focus landscape lens. The results depicted in FIGS. 3–6 are for the image of an optimally located subject. In actual practice the subject is not often at the optimum distance. A typical picture will thus be somewhat less sharp at the center because of the difference. In optical systems according to the present invention the image does not suffer so at its edges from the difference, because of the greater depth of focus there associated with the decreased effective opening through the vignetting stop 20 and the aperture stop 18.

Those skilled in the photographic and optical arts will recognize that computer aided studies will facilitate achieving the optimum effect in adapting this invention to a particular application.

Since changes may be made in the improved landscape lens and camera described above without departing from the scope of the invention herein involved, it is intended that all matter contained in the description or shown in the accompanying drawings shall be illustrative only and not interpreted in a limiting sense.

What is claimed is:

1. An optical system for a photographic camera consisting of:
   a positive meniscus lens element including at least one aspheric refracting surface;
   a first stop proximate the coma free position for said positive meniscus lens element; and
   a second stop midway between said first stop and said positive meniscus lens element.

2. The optical system described in claim 1 wherein said first stop is an aperture stop and said second stop is a vignetting stop.

3. The optical system of claim 2 wherein said vignetting stop has a diameter slightly larger than the diameter of said aperture stop.

4. The optical system described in claim 1 wherein its useful image area extends over a half field angle of 26°.

5. The optical system of claim 1, in which said lens element is made of a material having an Abbe dispersion value selected to reduce chromatic aberration, and said meniscus shape and said aspheric surface are selected in concert to reduce spherical aberration and astigmatic field curvature.

6. A camera, the photographic image forming portion of which consists of:
   a positive meniscus lens element having at least one aspheric refracting surface;
   a first stop proximate the coma free position for said positive meniscus lens element; and
   a second stop midway between said first stop and said positive meniscus lens element.

7. The camera described in claim 6 wherein said first stop is an aperture stop and said second stop is a vignetting stop.

8. The camera described in claim 7 wherein said vignetting stop is slightly larger than said aperture stop.

9. The camera described in claim 6 wherein said photographic image forming portion provides a useful image that covers a half field angle of 26°.

10. The camera described in claim 6 further including mechanical means for allowing said image forming portion to be positioned at either of two positions relative to a film plane in said camera, the first position predetermined so subjects near the camera are well focused on said film plane by said image forming portion and the second position predetermined so subjects far from the camera are well focused on said film plane by said image forming portion.

11. The camera described in claim 6 wherein said photographic image forming portion is represented by the following data:

$n = 1.49$; $\nu = 58$; $r_1 = 0.184F$; $r_2 = 0.278F$ at its vertex; $t_1 = 0.028F$; $s_1 = 0.056F$; $s_2 = 0.068F$; $D_1 = 0.051F$; and $D_2 = 0.048F$ wherein $n$ and $\nu$ represent the refractive index and the Abbe dispersion number of said meniscus lens element, $r_1$ and $r_2$ represent the radii of curvature of its first and second surfaces respectively, $t_1$ represents the axial thicknesss of said meniscus lens element, $s_1$ represents the axial separation between said second surface of said meniscus lens element and said vignetting stop, $s_2$ represents the axial separation between said vignetting stop and said aperture stop, $D_1$ and $D_2$ represent the diameters of said vignetting stop and said aperture stop respectively, and F represents the focal length of said meniscus lens element.

12. The camera described in claim 11 wherein said second surface is aspheric and is described by the formula:

$$Z = \frac{1}{2r_2}Y^2 + 29.083Y^4 - 44.969 \times 10^2 Y^6 + 38.08 \times 10^4 Y^8 - 10.991 \times 10^6 Y^{10}$$

where $Z$ is the height of said aspheric surface from a reference plane at a distance $Y$ from the optic axis in terms of a unit focal length $F$.

13. An optical system for a photographic camera consisting of:
   a positive meniscus lens element;
   an aperture stop proximate the coma free position for said positive meniscus lens element; and
   a vignetting stop midway between said first stop and said positive meniscus lens element, said system being represented by the following data: $n = 1.49$; $\nu = 58$; $r_1 = 0.184F$; $r_2 = 0.278F$ at its vertex; $t_1 = 0.028F$; $s_1 = 0.056F$; $s_2 = 0.068F$; $D_1 = 0.051F$; and $D_2 = 0.048F$ wherein $n$ and $\nu$ represent the refractive index and the Abbe dispersion number of said meniscus lens element, $r_1$ and $r_2$ represent the radii of curvature of its first and second surfaces, respectively, $t_1$ represents the axial thickness of said meniscus lens element, $s_1$ represents the axial separation between said second surface of said meniscus lens element and said vignetting stop, $s_2$ represents the axial separation between said vignetting stop and said aperture stop, $D_1$ and $D_2$ represent the diameters of said vignetting stop and said aperture stop, respectively, and $F$ represents the focal length of said meniscus lens element.

14. The optical system described in claim 13 wherein said second surface is aspheric and is described by the formula:

$$Z = \frac{1}{2r_2}Y^2 + 29.083Y^4 - 44.969 \times 10^2 Y^6 + 38.08 \times 10^4 Y^8 - 10.991 \times 10^6 Y^{10}$$

where $Z$ is the height of said aspheric surface from a reference plane at a distance $Y$ from the optic axis in terms of a unit focal length $F$.

* * * * *